United States Patent [19]

Stotz et al.

[11] 4,206,700
[45] Jun. 10, 1980

[54] ROLLING DEVICE

[75] Inventors: Wolf-Gunter Stotz, Ravensburg; Karl Kiesel, Mochenwangen, both of Fed. Rep. of Germany

[73] Assignee: Escher Wyss Limited, Zürich, Switzerland

[21] Appl. No.: 5,289

[22] Filed: Jan. 22, 1979

[30] Foreign Application Priority Data

Feb. 7, 1978 [CH] Switzerland .................. 1338/78

[51] Int. Cl.² .................. B30B 3/04; B21B 13/02
[52] U.S. Cl. .................. 100/162 B; 29/116 AD; 100/170
[58] Field of Search .......... 100/162 R, 162 B, 163 R, 100/168, 169, 170, 174, 175, 176; 29/163 AD, 116 AD

[56] References Cited

U.S. PATENT DOCUMENTS

| | | | |
|---|---|---|---|
| 3,879,827 | 4/1975 | Lehmann | 29/116 AD |
| 3,884,141 | 5/1975 | Lehmann | 100/163 R |
| 3,918,775 | 11/1975 | Lehmann | 100/162 R |
| 3,921,514 | 11/1975 | Biondetti | 100/162 B |
| 3,949,455 | 4/1976 | Biondetti | 29/116 AD |

*Primary Examiner*—Edward J. McCarthy
*Attorney, Agent, or Firm*—Werner W. Kleeman

[57] ABSTRACT

A rolling device or roller mill containing controlled deflection rolls is provided with a support arrangement possessing side portions having cutouts intended to receive bearing blocks for the rolls and closed by detachable closure elements. The side elements can be formed, as by cutting, from sheet plate and are only minimumly machined.

13 Claims, 5 Drawing Figures

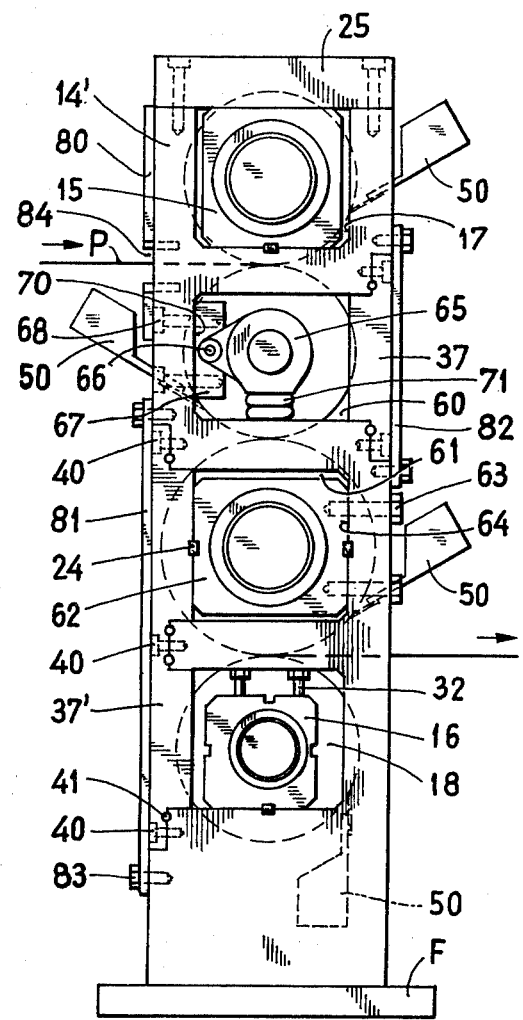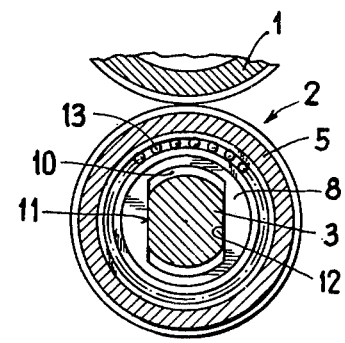

ROLLING DEVICE

BACKGROUND OF THE INVENTION

The present invention relates to a new and improved construction of a rolling device or roller mill which is of the type comprising at least one controlled deflection roll or adjustment roll—also referred to in the art as a roll with bending compensation—equipped with a roll shell rotatable about a support. The roll shell is supported upon support elements arranged between the support and the roll shell and movable relative to the support in at least one pressure plane in such a manner that the support elements are suitable for producing contact or lifting movements, and a support arrangement of the rolling device comprises vertical side elements at which there are supported the rolls.

Rolling devices or roller mills of this type, which can be constructed for instance according to U.S. Pat. Nos. 3,884,141, 3,921,514 to German patent No. 2,325,721 and can contain controlled deflection rolls of the type disclosed in U.S. Pat. Nos. 3,802,044 and 3,885,283, possess the considerable advantage that they do not require any external pressing or contact mechanism, such as, for instance, lever mechanisms having hydraulic or pneumatic cylinders or rubber bellows. As a result they are particularly simple in construction and space saving.

SUMMARY OF THE INVENTION

It is a primary object of the present invention to further improve upon the heretofore known rolling devices or roller mills with the aim of not only further mechanically simplifying the same, but additionally at the same time obtaining simplified conditions for the operation and the installation and dismantling of the rolls.

The inventive rolling device, by means of which this objective can be attained, is manifested by the features that the side elements have open cutouts or recesses or equivalent structure extending transversely with respect to the axial direction of the rolls. These open cutouts are suitable for the reception of bearing blocks or the like for the rolls and possess support surfaces for the support thereof. The cutouts are closed by closure elements detachably secured to the side elements and suitable for transmitting forces.

In this way there is obtained a particularly suitable and inexpensive, and thus, robust support arrangement, wherein, as already mentioned, the rolls, following removal of the closure elements, can be laterally or upwardly dismantled in a simple fashion.

The closure elements serving to take-up the traction or tension force can have contact or support surfaces extending in the direction of the traction or tension force. At the region of the contact surfaces there are arranged fixation elements intended to take-up thrust forces. In this way there is realized a particularly simple construction of the closure elements, since the otherwise required expensive exact machining or working of mutually interengaging or interacting surfaces needed for taking-up the tension forces is dispensed with.

According to a particularly advantageous construction the fixation elements can be cylindrical or slightly conical pins, the axis of which extends in the contact surface of both elements, i.e., the closure and side elements and is arranged perpendicular to the force direction. The pins are attached at one of the elements or parts to be interconnected. Such type pins can be easily arranged, since they only require a bore which need be guided with no particular accuracy. The pins are particularly well utilized for the purpose of force transmission, since they perform a support or carrying function not simply at their circular cross-section rather along their entire length. Finally, they possess the further advantage, owing to their domed or arched configuration, that during a subsequent assembly of the equipment they position the closure elements at the contact surfaces and thus facilitate the assembly or erection work.

Moreover, at least one closure element can extend over at least two cutouts or recesses which are directed towards the same side. This appreciably simplifies the construction of the rolling device or roller mill. Additionally there are obtained strength advantages since a common closure element is stronger and more rigid than, for instance, two adjacently arranged separate closure elements.

Preferably the side elements can consist of solid material of essentially constant thickness, can be rectangular and have essentially linear or straight end surfaces.

Although such simple and robust shape also can be fabricated of cast iron, it is particularly suitable for fabricating the side elements from rolled steel material, the end surfaces can be produced by gas or flame cutting, and it is only necessary to machine the contact or support surfaces for the bearing blocks and the closure elements. In this way the equipment can be particularly simplified and rendered inexpensive to manufacture, and additionally there are obtained especially rigid side elements.

Moreover, devices such as for instance scrapers, which are preferably associated with the individual rolls, can be arranged in each case at the side of the side elements which face away from the opening of the cutout in such a manner that the rolls can be dismantled without having to dismantle such device. Consequently, there is obtained the particularly important advantage that the scraper or similar or other devices, such as, for instance, measuring devices, control devices and so forth, can remain in their position during dismantling of the rolls.

The bearing blocks or bearing means of at least one roll can possess a number of contact or support surfaces having different spacing with respect to the axis of the roll. In this way it is possible to take into account in a most simple manner different diameters of the rolls as delivered or changes in the roll diameter following roll grinding.

Furthermore, it is possible to construct the contact or support surfaces of the bearing blocks for at least one roll at parts movably mounted at the side elements, and which are supported against the action of the roll force with a pre-bias or pre-stress by means of elastic elements. These parts bear upon impact or stop surfaces. In this way there is obtained a simple safety or protective device against overloading the rolls, if, for instance, a foreign body or the like should become deposited or entrapped between the roll surfaces.

BRIEF DESCRIPTION OF THE DRAWINGS

The invention will be better understood and objects other than those set forth above, will become apparent when consideration is given to the following detailed description thereof. Such description makes references to the annexed drawings wherein:

FIG. 4 is a cross-sectional view of the arrangement of FIG. 1, taken substantially along the section line IV—IV thereof; and FIG. 5 is a side view of a rolling device or roller mill, corresponding to the showing of FIG. 2, equipped with four rolls.

DETAILED DESCRIPTION OF THE PREFERRED EMBODIMENTS

Figure 1:
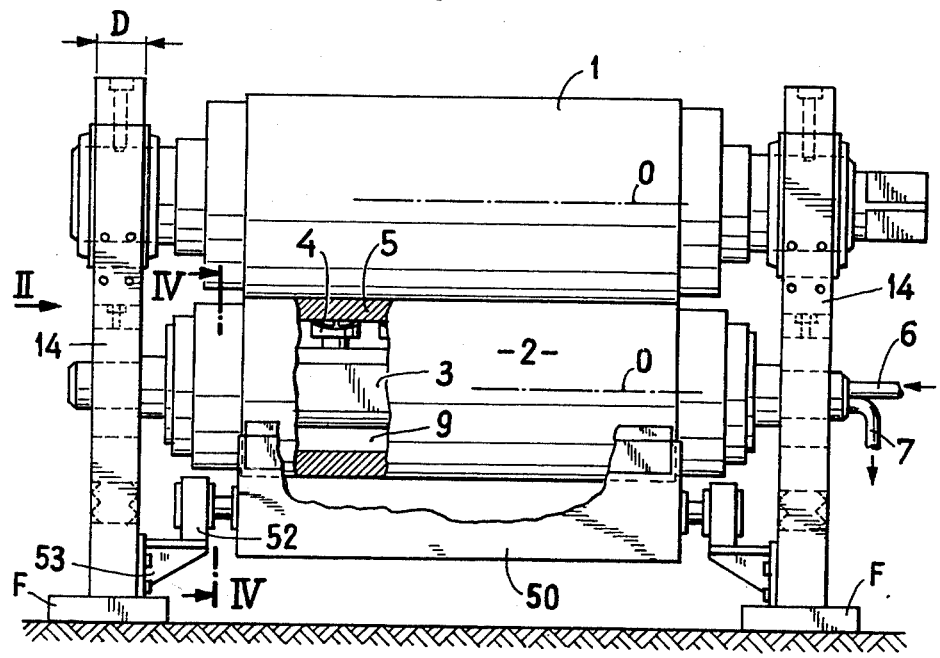
FIG. 1 is a front view, partly in section and with removed parts to enhance clarity of the illustration, of a rolling device or roller mill incorporating two rolls.

Describing now the drawings, the rolling device or roller mill illustrated by way of example in FIG. 1, which for instance can be a calender for smoothing a paper web, will be seen to comprise a solid roll 1 and a controlled deflection roll 2. The controlled deflection roll 2, as is known in this art, may be actuated, for instance, by an hydraulic pressurized medium and can be constructed according to the teachings of U.S. Pat. Nos. 3,802,044 and 3,885,283, to which reference may be readily had and the disclosure of which is incorporated herein by reference.

The controlled deflection roll 2 contains a fixed, non-rotatable support 3 in which there is guided hydraulic pistons 4 defining support elements upon which there is hydrostatically mounted a roll shell 5 rotatable about the support 3. The not particularly illustrated cylinder bores in which the hydraulic pistons 4 are guided have infed thereto the hydraulic pressurized fluid medium by means of a line or conduit 6 from a not particularly illustrated pump installation or the like. The hydraulic medium is withdrawn by means of an outfeed or withdrawal line 7 from the intermediate space 9 between the support 3 and the roll shell 5.

As best seen by referring to the sectional view of FIG. 4, the roll shell 5 is provided at its ends with guide disks 8 or equivalent structure, having cutouts 10 provided with guide surfaces 11 which are guided along similar substantially parallel guide surfaces 12 of the support 3. The guide disks 8 are mounted in ball bearings or equivalent structure 13 at the roll shell 5. This construction, which is known from the aforementioned U.S. Pat. No. 3,885,283, enables an upward movement and a lowering movement of the roll shell 5 under the action of the hydrostatic pistons 4, so that there can be dispensed with an outer contact or press mechanism for the roll 2, for instance hydraulic cylinders or pneumatic bellows or the like.

Figure 2:
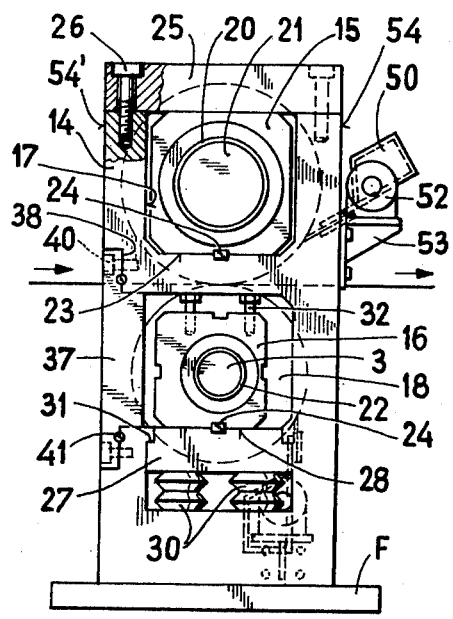
FIG. 2 is a view of the rolling device shown in FIG. 1, looking in the direction of the arrow II of such FIG. 1, with the opposite side structured essentially like the side shown.

As further seen by referring to FIGS. 1 and 2, the rolls 1 and 2 are mounted in a support or frame arrangement which comprises side elements 14 which are attached in any suitable manner upon base plates F which, in turn, in known manner are anchored in not particularly illustrated fashion at the floor or other support surface.

As particularly well seen by referring to FIG. 2, the rolls 1 and 2 are provided with bearing blocks or bearing means 15 and 16 which are arranged in cutouts or recesses 17 and 18 of the side elements 14, which are open upwardly or towards the side and extend essentially perpendicular to the axial direction O of the rolls. The bearing blocks 15 at the opposite ends of the solid roll 1 are provided with slide or antifriction bearings 20 in which there are mounted the rotatable bearing pins or journals 21 of the roll 1. The opposed ends of the support 3 are supported in openings or bores 22 of each bearing block 16, and they are prevented from rotating relative to the bearing blocks by any suitable and therefore not particularly illustrated arresting or blocking means. Each bearing block 15 is supported at its associated side element 14 upon a machine worked bearing or contact surface 23 and is prevented from carrying out lateral movement by a fitting or adjustment spring 24 or equivalent structure. The bearing block 15 is held from above by means of a yoke 25 or the like and which is fixedly threadably connected at the side element 14 by means of screws or threaded bolts 26 or equivalent fastening expedients and forms a closure element enclosing the cutout or recess 17.

The bearing block 16 is supported upon a part or member 27 which is movably guided at the side element or portion 14. Part 27 has a support or contact surface 28. This part 27 is supported by suitable elastic elements, such as plate springs 30 against stepped stop or impact surfaces 31. The plate springs 30 have a spring force which is larger than the maximum permissible operating force between the rolls 1 and 2 and enables lift-off of the rolls from one another when this force is exceeded. Screws or threaded bolts 32 or equivalent devices are provided for supporting the bearing block 16 at the related part or member 27. Lateral shifting of the bearing block 16 is likewise prevented by means of fitting spring 24.

Figure 3:
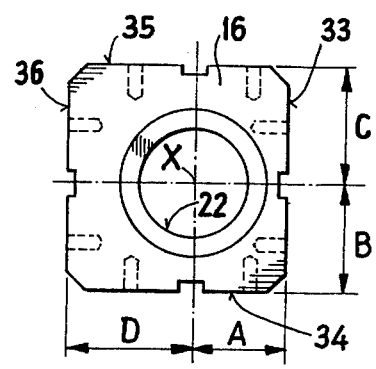
FIG. 3 is a view corresponding to the showing of FIG. 2 of the bearing block or bearing means of the lower roll and shown on an enlarged scale.

As best seen by referring to FIG. 3, each bearing block or bearing means 16 for the support 3 of the roll 2 is constructed such that its four lateral contact or support surfaces 33, 34, 35 and 36 possess a different spacing A, B, C and D from the axis X of the bore 22. By appropriately selecting the axial spacing A, B, C or D there can be set or adjusted different spacings of the support 3 from the axis of the roll 1, so that fabrication tolerances of the rolls or changes of their diameter following post grinding thereof can be taken into account.

In accordance with the illustration of FIG. 2 the cutouts or recesses 18 for mounting the lower roll 2 are laterally closed by closure elements 37, only one such closure element 37 being visible in such Figure. The closure elements 37, which are loaded during operation by tension or traction forces, are attached at the side elements 14 by screws or threaded bolts 40 so as to nest upon the bearing or contact surfaces 38. These bearing or contact surfaces 38 extend in the direction of the force which loads the same, i.e., parallel to the plane taken through the axis O of the rolls 1 and 2 and parallel to the direction of movement of the pistons 4.

In order to take-up the thrust forces which are effective along the contact or support surfaces 38 there are provided pins 41, the axis of which extends essentially through the common contact or support surface 38. During the initial assembly the closure elements 37 are attached by the screws or threaded bolts 40 or equivalent structure, whereafter there are drilled and reamed the bores for the pins 41, which extend as perpendicular as possible to the thrust forces effective during operation, i.e., parallel to the axes of the rolls 1 and 2. Thereafter there are mounted the pins 41 which preferably are attached at one of the elements or parts, the closure element 37 or the side element 14, for instance by means of a weld or a soldered connection. The pins 41 or the like may be cylindrical or have a slightly conical shape.

During operation the pins 41 transmit the occurring traction force as a shearing force over the cross-section of their entire length. During assembly following the erection work the pins 41 facilitate the attachment of the closure elements 37 since their domed cylindrical surface have a centering action during mounting of the elements or parts.

As still apparent from the showing of FIGS. 1 and 2, the rolls 1 and 2 are provided with scrapers 50 or equivalent structure. The upper scraper 50 coacting with the roll 1 is pivotably mounted in the bearing or support housings 52 which are attached to brackets 53 or the like which, in turn, are secured to end walls 54 of the side elements or parts 14. The other lower scraper 50 coacting with the roll 2 is mounted in bearing housings 52, whose brackets 53 are secured at the inner side walls of the side elements 14.

As further seen by referring to FIGS. 1 and 2, the side elements 14 are fabricated of solid material of essentially constant thickness D and have a rectangular shape with linear end surfaces 54 and 54', respectively. Such form is particularly suitable for fabrication from rolled steel material, for instance of steel plate, and by using simple means that can be obtained a particularly great strength and rigidity of the support arrangement. Most of the surface thus can be fabricated in a simple manner by flame cutting without any further post machining work. Machining work is only required at the contact or support surfaces of the bearing blocks 15 and 16, the closure elements 25 and 37 and the guide surfaces of the part or element 27. On the other hand, the brackets 53 can be attached to unworked or non-machined surfaces or surfaces which have been only crudely or roughly worked by flame or gas cutting, since the bearings of the bearing housing 52 enable inclination of the shaft of the scrapers.

Due to the particularly simple construction it is to be appreciated that the illustrated support arrangement allows for a rapid dismantling of the rolls 1 and 2. The roll 1, following removal of the closure elements 25, can be upwardly raised, the roll 2, following removal of the closure elements 37, can be laterally dismantled. Since the scrapers 50 are arranged in each case at the side of the cutouts or recesses removed from the closure elements the removal of such scrapers, during dismantling of the rolls, is not necessary.

FIG. 5 illustrates in side view a rolling device or roller mill having four rolls and which in principle corresponds to the arrangement of FIGS. 1 to 3. The parts shown in FIG. 5 correspond to those of FIGS. 1 to 3, therefore, have been generally conveniently designated with the same reference characters. Moreover, it is thought sufficient to simply consider at this point the differences between both embodiments.

Thus, in addition to the cutouts or recesses 17 and 18 there are further provided two additional cutouts or recesses 60 and 61. Provided in the cutout 61 is a bearing block or bearing means 62 which essentially is the same as the bearing block or bearing means 15, however attached by screws or threaded bolts 63 or equivalent fastening devices to a support surface 64 at a side of the cutout 61. The cutouts 18 and 61 are both conjointly covered by a single closure element 37'. This closure element 37' is secured and fixed in the same manner as the closure element 37 by the screws or threaded bolts 40 and pins 41. The bearing block 62, apart from being fixed at the surface 64, is also still fixed at the closure element 37' by a spring 24 or equivalent structure.

In the cutouts 60 of the side elements 14' of FIG. 5 there are arranged pivotal bearing blocks or bearing means 65 which are connected by pins 66 or the like with the base plates 67 which, in turn, are attached by screws or threaded bolts 68 at a side surface 70 in the cutout 60. If the roll which is mounted in the cutout 60 is a solid roll or if for instance it is a roll of the type disclosed in U.S. Pat. No. 3,802,044 devoid of its own lifting mechanism, then there can be provided between the bearing block 65 and the lowersurface of the cutout 60 a simple lifting mechanism in the form of a rubber bellows 71 or equivalent structure which can be actuated by compressed air.

It should be understood that the Figures, especially FIG. 5, only constitute schematic views, and that the illustrated bearing blocks as well as also the cutouts can be varied in different other combinations. Thus, for instance, in FIG. 5 the upper bearing block 15 can be replaced by a bearing block 16. The movable bearing block 65 can be used at a different location or can be completely omitted.

As also best seen by referring to FIG. 5, both of the side elements 14' of the rolling device or roller mill are interconnected with one another by plates 80, 81 and 82 which can be attached to the side elements, for instance by screws or threaded bolts 83 or the like. The plates serve for reinforcing the rolling device or roller mill in lateral direction as well as also as providing finger guards in order to prevent injury by the rolls to the persons servicing the equipment. Between the plates 80 and 81 there is located a gap or space 84 rendering possible the introduction of a paper web P. The same plates also can be provided for the equipment of FIGS. 1 and 2.

While there are shown and described present preferred embodiments of the invention, it is to be distinctly understood that the invention is not limited thereto, but may be otherwise variously embodied and practiced within the scope of the following claims. Accordingly,

What we claim is:

1. A rolling device comprising:
at least one controlled deflection roll;
said controlled deflection roll comprising:
   a support;
   a rotatable roll shell rotatable about said support;
   support elements supported between said support and said roll shell;
said roll shell being movable relative to the support in at least one pressure plane such that the support elements are suitable for producing contact and lifting movements;
a support arrangement for the rolling device;
said support arrangement having substantially vertical side elements at which there is supported the controlled deflection roll;
said side elements possessing open cutouts extending transversely with respect to the axial direction of the controlled deflection roll;
said cutouts serving for the reception of bearing blocks for the controlled deflection roll;
bearing blocks for the roll provided for said cutouts;
said cutouts having support surfaces for supporting the bearing blocks;

closure elements suitable for force transmission and detachably connected to said side elements; and said closure elements serving for closing the cutouts.

2. The rolling device as defined in claim 1, wherein:
said closure elements serve for taking-up traction forces and have contact surfaces extending in the direction of the traction force; and
fixation elements arranged at the region of the contact surface and serving to take-up thrust forces.

3. The rolling device as defined in claim 2, wherein:
said fixation elements comprise pin members;
said side elements have contact surfaces;
said pin members each having an axis extending in said contact surfaces of both the side elements and the closure elements and in a direction essentially perpendicular to the force direction;
said pin members being secured at one of the elements which are to be connected.

4. The rolling device as defined in claim 3, wherein:
said fixation elements comprise substantially cylindrical pin members.

5. The rolling device as defined in claim 3, wherein:
said fixation elements comprise slightly conical pin members.

6. The rolling device as defined in claim 1, wherein:
at least one of the closure elements extends over at least two cutouts directed towards the same side.

7. The rolling device as defined in claim 1, wherein:
said side elements each are formed of a solid material of essentially constant thickness, are substantially rectangular in configuration and possess linear end surfaces.

8. The rolling device as defined in claim 7, wherein:
said side elements consist of rolled steel material and have end surfaces fabricated by flame cutting; and
only contact surfaces for the bearing blocks and for the closure elements being machined.

9. The rolling device as defined in claim 1, further including:
means operatively associated with each of the rolls;
said operatively associated means being secured at a side of the side elements facing away from the opening of the cutouts in such a manner that the rolls can be dismantled without disassembling said operatively associated means.

10. The rolling device as defined in claim 9, wherein:
said operatively associated means comprise scraper means.

11. The rolling device as defined in claim 1, wherein:
the bearing blocks for at least one of the rolls has a number of contact surfaces which are spaced at different distances from the lengthwise axis of the roll.

12. The rolling device as defined in claim 1, wherein:
contact surfaces of the bearing blocks of at least one roll are formed at parts movably guided at the side elements;
elastic elements for supporting said parts against the action of the support force of the roll; and
impact surface means against which bear said parts.

13. A rolling device comprising:
at least one roll;
a support arrangement for the roll;
said support arrangement having substantially vertical side elements at which there is supported the roll;
said side elements possessing open cutouts extending transversely with respect to the axial direction of the roll;
said cutouts serving for the reception of bearing blocks for the roll;
bearing blocks for the roll mounted in said cutouts;
said cutouts having support surfaces for supporting the bearing blocks;
closure elements detachably connected to said side elements; and
said closure elements serving for closing cutouts.

* * * * *